(12) United States Patent
Jørgensen (10) Patent No.: US 12,372,331 B2
(45) Date of Patent: Jul. 29, 2025

(54) DEVICE FOR ACHIEVING FRICTIONLESS LINEAR MOVEMENT IN A SINGLE DIRECTION AND STIFFNESS IN ALL OTHER DIRECTIONS

(71) Applicant: Inno Invent ApS, Vipperød (DK)

(72) Inventor: Glenn Arthur Jørgensen, Vipperød (DK)

(73) Assignee: Inno Invent APS, Vipperød (DK)

( * ) Notice: Subject to any disclaimer, the term of this patent is extended or adjusted under 35 U.S.C. 154(b) by 0 days.

(21) Appl. No.: 18/529,926

(22) Filed: Dec. 5, 2023

(65) Prior Publication Data

US 2024/0191974 A1 Jun. 13, 2024

(30) Foreign Application Priority Data

Dec. 7, 2022 (DK) .......................... PA 2022 01108

(51) Int. Cl.
*F41G 11/00* (2006.01)

(52) U.S. Cl.
CPC .......... *F41G 11/002* (2013.01); *F41G 11/003* (2013.01)

(58) Field of Classification Search
CPC .............................. F41G 11/002; F41G 11/003
See application file for complete search history.

(56) References Cited

U.S. PATENT DOCUMENTS

| 5,310,157 A | 5/1994 | Platus |
| 6,268,676 B1 | 7/2001 | Brunken |
| 2014/0123786 A1 | 5/2014 | Hendershott |

FOREIGN PATENT DOCUMENTS

| CN | 113028899 A | 6/2021 | |
| WO | WO-2014122639 A1 * | 8/2014 | ............. F41C 27/00 |
| WO | 2021244716 A1 | 12/2021 | |

OTHER PUBLICATIONS

Danish Patent and Trademark Office Search Report for corresponding patent application No. PA 2022 01108, dated Feb. 21, 2023, 3 pages.

* cited by examiner

*Primary Examiner* — Jonathan C Weber (74) *Attorney, Agent, or Firm* — PATTERSON INTELLECTUAL PROPERTY LAW, P.C.; Emily A. Shouse (57) ABSTRACT

A device for achieving linear movement in a single direction and stiffness in all other directions. As an example, a recoil causes strong forces in a linear movement, but any ridges will produce errors as two units each try to return to its original position. The device is a damper. The linear displacement by a recoil is mitigated using two set of blades, one absorbing the linear recoil, and a second for hindering the linear parallel deflection of the first set by the recoil or for increasing the stiffness provided by the first set of blades. The produced errors are much smaller or none as the recoil is mitigated using the very strong damper.

3 Claims, 11 Drawing Sheets

DEVICE FOR ACHIEVING FRICTIONLESS LINEAR MOVEMENT IN A SINGLE DIRECTION AND STIFFNESS IN ALL OTHER DIRECTIONS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: DK PA 2022 01108 filed Dec. 6, 2023.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a device for achieving linear movement in a single direction and stiffness in all other directions for a system to maintain its relative position. An example is to maintain the position of an accessory relative to the scope of the weapon to which it is attached after e.g. a shot fired from the weapon causing a recoil exerted on the accessory.

BRIEF SUMMARY OF THE INVENTION

Modern firearms and other weapons are often equipped with various accessories. When a shot is fired from such weapon, firing reaction forces are produced, acting on the accessories of the weapon via the weapon and resulting in shock-wave like recoil accelerations.

With respect to firearms, many accessories can be sensitive towards the involved recoil accelerations, such accessories can be, but are not limited to, IR-cameras, light intensifiers, rifle scopes (a telescopic sight on a rifle) etc. Typically, the larger the recoil accelerations the accessories must deal with, the more expensive the accessories become. This is due to the complicated nature of ensuring robustness of the internal components and the mounting of these, but also since these products typically are not being produced and sold in large numbers.

Damping devices of prior art have a number of damping springs, which are arranged between the accessory and the weapon and by means of which the forces absorbed by the components of the accessory can be limited to a maximum that lies below the destruction threshold of the corresponding components. This involves movement of the accessory relative to the weapon during the dampening process.

It is often the case, that the optimum performance of the accessories requires these to regain after each shot their relative position to the weapon to which they are attached. Especially any slight changes of angle in any of the three principal directions can have devastating impact on the performance, but also positional changes can have a negative impact on performance. Thus, optimum performance of accessories typically requires the accessory to regain its exact original position relative to the weapon it is attached in all six degrees of freedom.

Whenever movement occurs between ridged parts there is a possibility for frictional forces to play a role. This is for instance the case for roller-based systems. As the static coefficient of friction typically is higher than the dynamic coefficient of friction, any of the moving parts where friction is involved can come to rest at a new position and angle after each shot.

It is desired to develop a solution for a system where a position of a part has to regain its exact position every time a disturbance takes place as in an interferometer where the disturbance must not introduce an angle deviation of light reflected by the mirror. On firearm weapons, the solution has to dramatically reduce the overall cost of an accessory system and keep the total system weigh to a minimum.

Not only soldiers but also hunters will be able to shoot precisely using a rifle with e.g. a recoil mitigated IR-camera.

The solution should be cheap and maintain precision of a system.

WO2021/244716 A1 discloses a damper system which uses rotational friction dampers (40) to dampen a lateral movement of a cable. The objective is that the lateral movement should be stiff and only the axial movement should be allowed. Blade elements move primary in plane of blade, and a pair of set of blades is connected to each other pivotally with resistance to the pivotally movement. The damper consists of three modules which consist of two set blades connected pivotally with resistance in the hinge. The movement is not a frictionless linear translation obtained by the flexure of the blades.

The objective problem is to provide an alternative construction of a device that achieves linear movement in a single direction and stiffness in all other directions.

Figure 7:
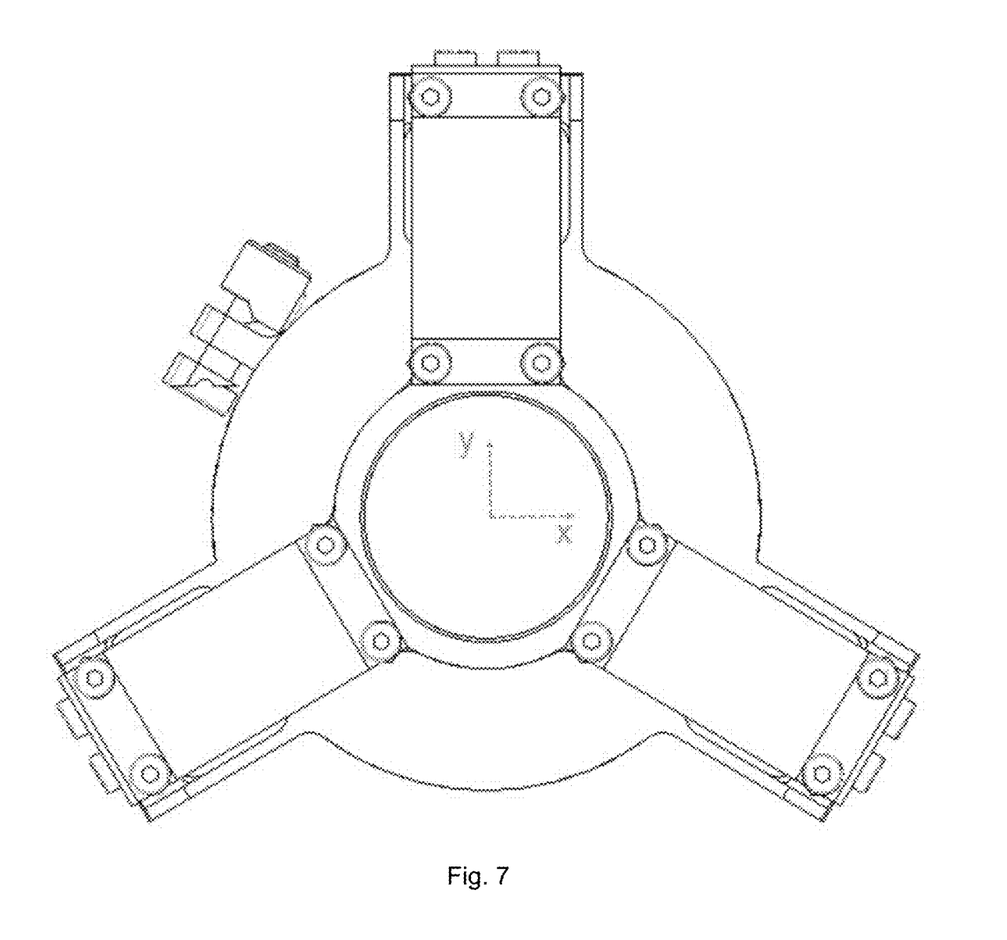
FIG. 7 is a drawing showing a front view of the preferred embodiment of the invention where a coordinate system illustrates the vertical and horizontal lines with the origin in the center of the first annular member.

After intensive study the problem leading to a large work the above problem has been solved by providing a device for achieving linear movement in a single direction and stiffness in all other directions where the device, as claimed in claim 1, comprises at least two modules comprising at least two set of blades, the first set of blades attached in one end to a first member, and in the other end connected to the second set of blades in their first end, the second set of blades attached in their second end to a second member, and wherein all of the first set of blades and all the second set of blades of at least two modules are mounted symmetrically about a plane containing the single direction, and wherein within each module the second set of blades is arranged to counteract the secondary movement of the first set of blades, to obtain relief in the first set of blades in the direction perpendicular to the single direction. The vertical center plane is the plane in which the Y-axis lies on and perpendicular to the X-axis shown on FIG. 7, which is a drawing of the front view of an embodiment. The 3D perspective of FIG. 7 is FIG. 4. The two modules are symmetrical about this center plane.

An anticipated embodiment of the invention is where the second set of blades is orthogonal to or parallel with the first set of blades in claim 2.

Another anticipated embodiment wherein said blades are rectangular and the size of the sets of blades are specified is anticipated in claim 3.

An embodiment is anticipated the device further comprises a first and a second member wherein the modules are attached symmetrically in one end around and on said first member, which is annular, and the second member having an annular part, the members are close to each other, the center opening of the first annular member coincides with the center of the annular part of the second member.

An anticipated embodiment is anticipated wherein the first member is adapted to be mounted onto a first accessory and the second member adapted to be mounted on a scope, the number of modules may be either two or three in the same plane perpendicular to the open end of the annular first part. If there are two, the angle between the two modules are 180 degrees and if there are three, the angle between two modules closest to each other and in the same plane is typically but not limited to 120 degrees.

An embodiment of the invention wherein the device is adapted to be placed on a firearm between the firearm and its scope the modules being in a plane parallel to the X-Y plane perpendicular to the single direction is also anticipated.

An anticipated embodiment is further the device wherein the first set of blades are in a plane parallel with the plane of the second set of blades.

A firearm having an accessory mounted on the scope is anticipated where a list of accessories is provided are anticipated.

A firearm where the device according to the invention is mounted between the firearm and the scope.

Using a "porch-swing" mechanism as described in US2004261276 to obtain a precision frictionless flexure based linear translation mechanism insensitive to thermal and vibrational environments is a known method to avoid angle errors in a linear movement within optical precision instruments such as interferometers etc. Here the moving part often referred to as the "carriage" can be moved in a linear fashion without in theory introducing any angle changes of the carriage and without the influence of frictional forces.

However, in addition to the linear movement along the desired axis, the carriage experiences a secondary linear movement along an axis perpendicular to the said first axis.

To ensure a stable mount, ideally the stiffness of the device holding the accessory is as large as possible in all other directions than the one defined by the direction of the main recoil acceleration. In case of the single "porch-swing" mechanism the carriage is carried by a blade component at each end. The stiffness of such arrangement in the direction of the secondary movement at the origin is in practice typically less for compression than tension in the direction of said secondary movement, because a slight sideways movement will introduce a bending moment rather than keeping pure compression.

In conclusion, a solution to the problem of the invention may be found which allows the use of accessories with less critical recoil acceleration values.

This requires insertion of a device between the weapon and the accessory which can act to reduce and dampen the recoil accelerations below a critical value given for the accessory of interest.

The present invention provides a device based on a multiple porch-swing system. The multiple porch-swing ensures precision frictionless flexure based linear translation mechanism insensitive to thermal and vibrational environments and at the same time eliminates the secondary linear movement normally occurring perpendicular to the desired linear movement. The elimination of the secondary movement is done by pairing the first set of swing-porch system with one or more swing-porch systems counter-acting the said secondary movement. This allows for the creation of a system with large stiffness in both tension and compression of the blades, hence maximizing the stiffness in all directions except the direction of the main movement. Many systems require this. In interferometry a mirror has to be kept in a precise position securing the path of light with no angle deviations.

The system has been demonstrated with great success in field operations using 50 BMG caliber guns. The device has been demonstrated to provide a mass-efficient recoil mitigation of accessories mounted on the gun, ensuring the accessory regains in all six degrees of freedom its original relative position to the gun on which it is attached.

The invention may also be used to dampen a recoil exerted on the scope of a firearm. In this case the device should preferably comprise two modules on a circle on the scope arranged in the X-Y-plane, see also FIG. 7, with 180 degrees between the two modules.

BRIEF DESCRIPTION OF THE SEVERAL VIEWS OF THE DRAWINGS

In order that the invention may be well understood, some non-limiting examples will now be described in detail with reference to the figures in which.

DETAILED DESCRIPTION OF THE INVENTION

Figure 1:
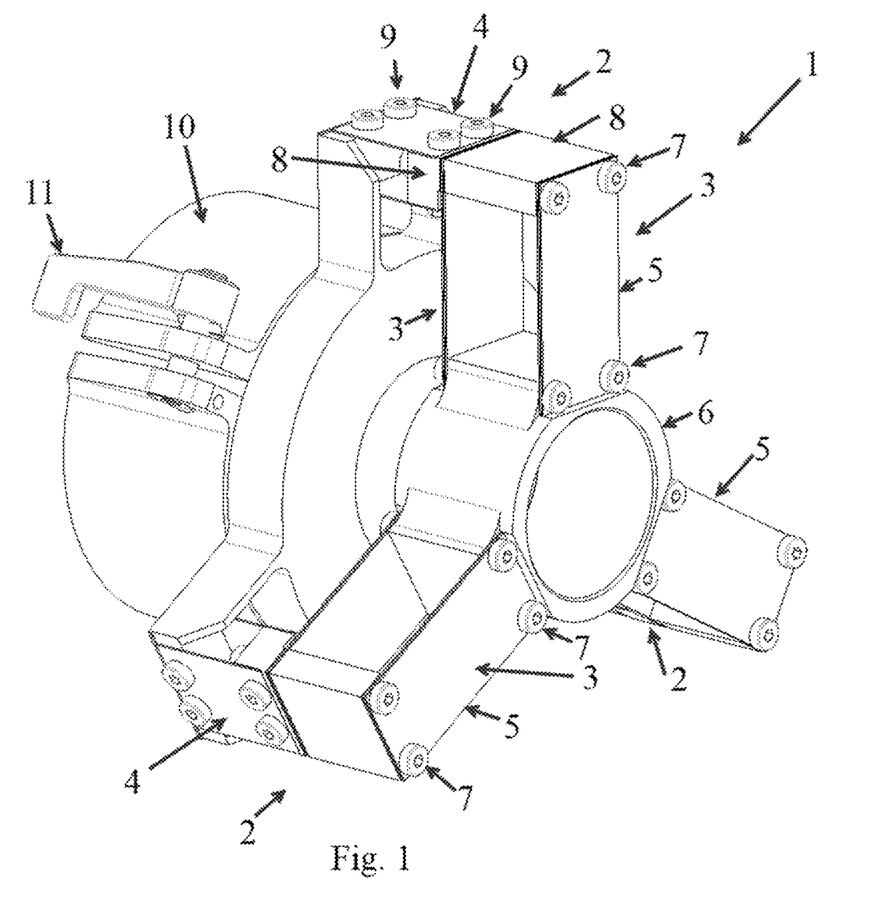
FIG. 1 is a drawing showing a preferred embodiment of the device according to the invention.

FIG. 1 is a drawing of a preferred embodiment of the present invention. It is a device (1) having on its exterior three modules (2) comprising a first set (3) and a second set (4) of blades (5) placed on an annular member (6) with 120 degrees between two adjacent modules (2).

The two sets of blades are assembled in the ends with spacers. Each set is assembled in the bottom and top of each rectangular blade with two first transvers bolts (7) and one spacer, the outer two (8) having three walls in a horse shoe formation, the bottom to one end of a first transvers bolt (7) and the top to the other end. Each first set of blades (3) and each second set of blades (4) of each of the three modules (2) are attached to each other with second transverse bolts (9) and a spacer (8) or several thin spacers in each end having three walls in a horse shoe formation. The first set of blades have four rectangular blades, two adjacent blades in a left side and two adjacent blades in the right side, the second set of blades have two rectangular blades. The number of blades acting in parallel in each system is determined by the amount of mass to be carried and the amount of recoil to be mitigated. The flat areas of the rectangular blades of the second set are perpendicular to the flat area of the blades of the first set of blades. The second set of blades are attached to a member (10) having an annular part where the center coincides with the center of the first annular member (6). The device is attached to e.g. a firearm using a J-lock (11). The bottom spacer is attached to the first annular member (6).

A usable scope requires that the recoil of an accessory takes place without any angle displacements. A porcheswing system here the first set of blades (3) fulfills that a load is displaced in a linear movement upon being subjected to a linear force and return to its original position almost without any angular displacement errors. A usable scope requires also that all orthogonal displacements errors are eliminated. This is secured with the two-porche-swing system of the invention. The first set of blades enables a linear displacement with a little displacement orthogonally to this and a return to the original position, the second set of blades (4) secures that any orthogonally displacement errors are eliminated by this movement. At the same time the stiffness of the device (1) of the invention is increased.

Figure 2:
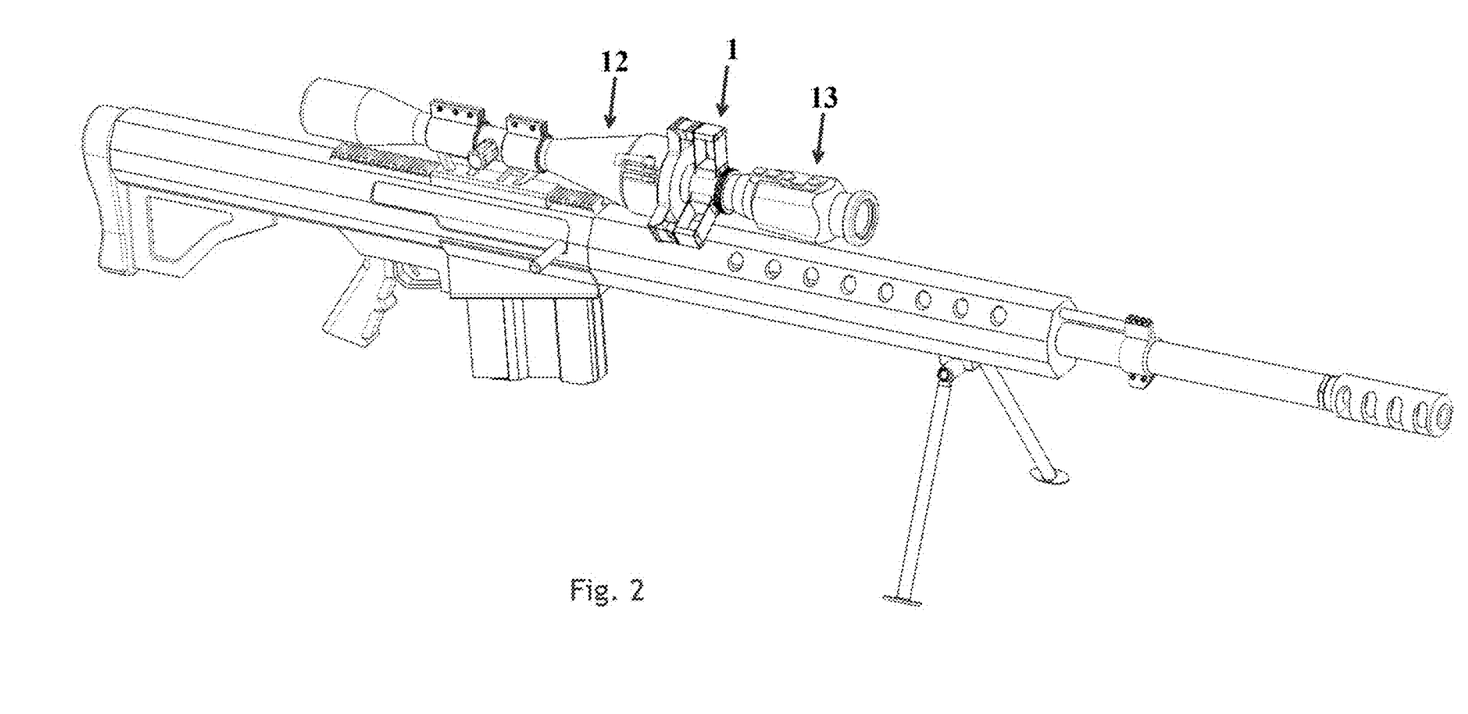
FIG. 2 is a drawing showing a firearm with the preferred embodiment of the device of the invention mounted between the scope and a thermal IR-camera.

FIG. 2 is a drawing of a BMG rifle where the device (1) of FIG. 1 is mounted between the rifle scope (12) and a thermal IR-camera (13).

Figure 3:
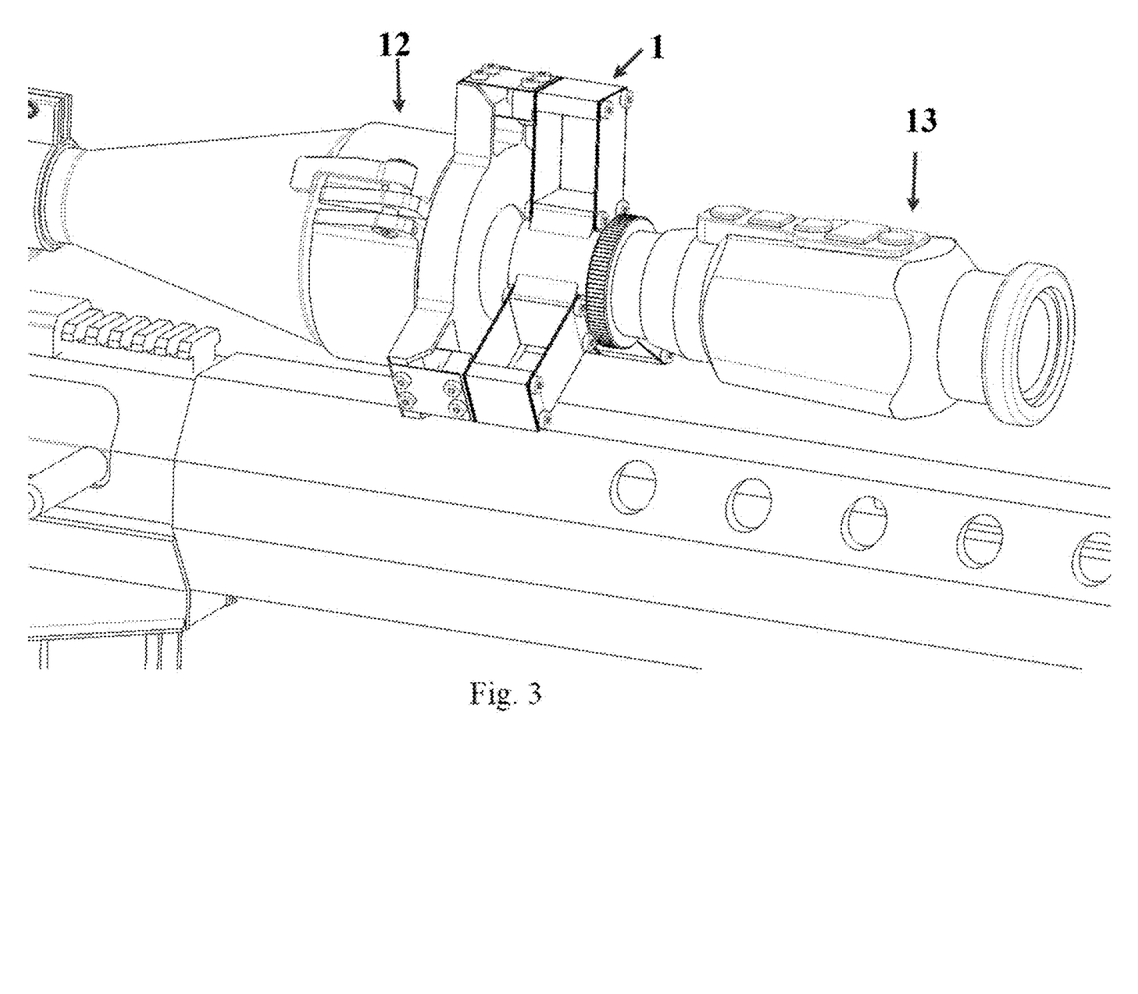
FIG. 3 is a drawing showing an exploited view of FIG. 2 of the scope, the device of the invention, and the thermal IR-camera.

FIG. 3 is a drawing of an exploited view of FIG. 2 showing the details of the end of the scope close to the device of FIG. 1, the device of FIG. 1, and the IR-camera better.

Figure 4:
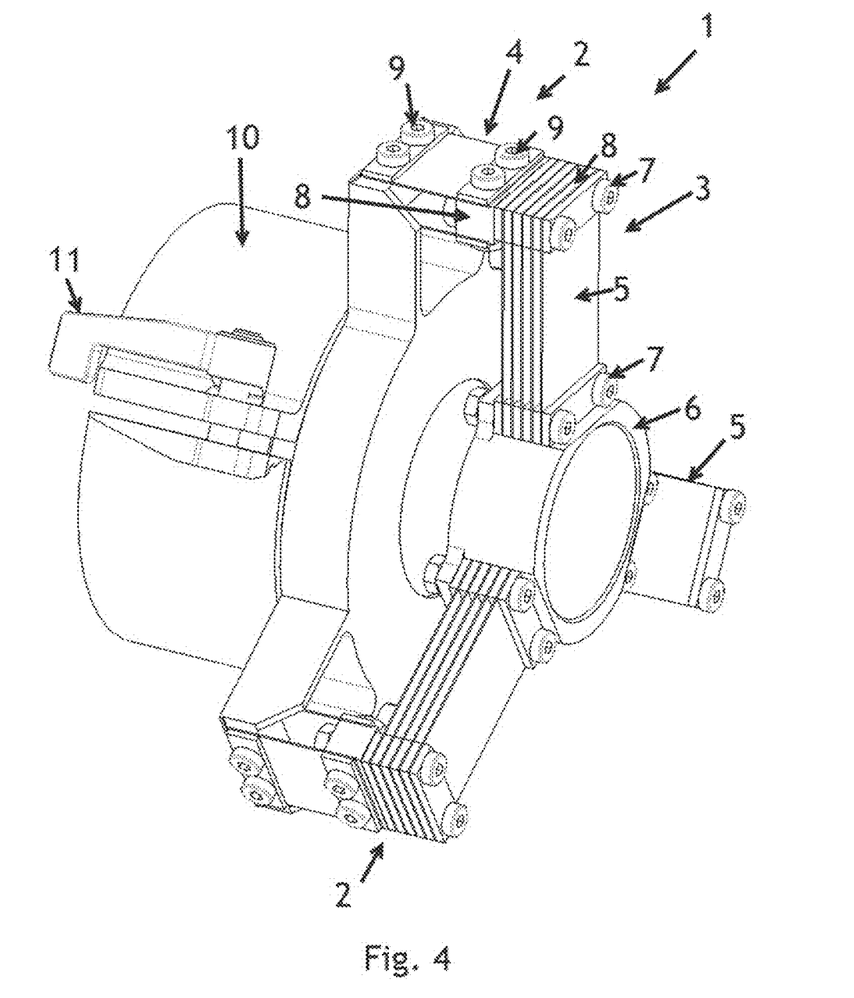
FIG. 4 is a drawing showing another embodiment of the device according to the invention.

FIG. 4 is a drawing of another embodiment of the invention where the number of blades in the first set of blades (3) is five. There are six spacers (in top and in the bottom of the first set. The other features of the embodiment are the same as in FIG. 1. The bottom spacer is attached to the first annular member (6).

Figure 5:
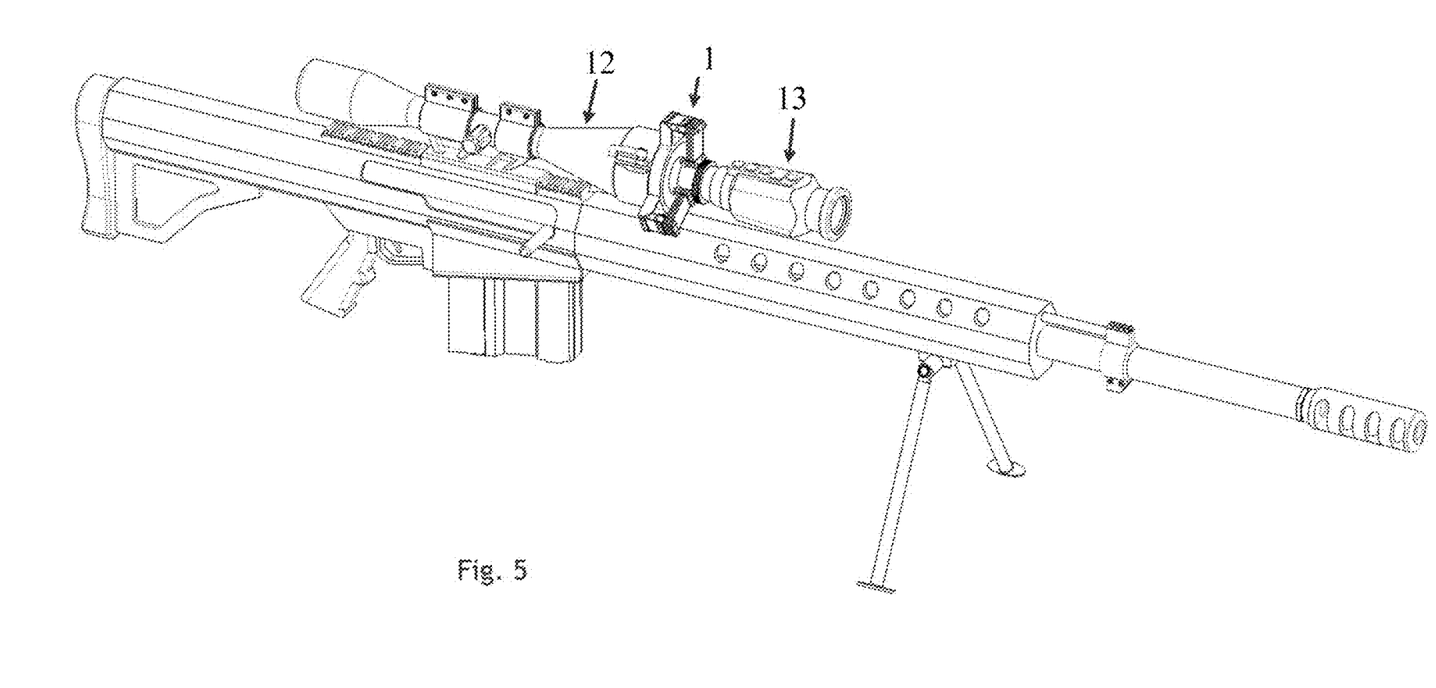
FIG. 5 is a is a drawing showing a firearm with the embodiment of the device of the invention in FIG. 4 mounted between the scope and the thermal IR-camera.

FIG. 5 is a drawing of a BMG rifle where the embodiment (1) of FIG. 4 is mounted between the rifle scope (12) and a thermal IR-camera (13).

Figure 6:
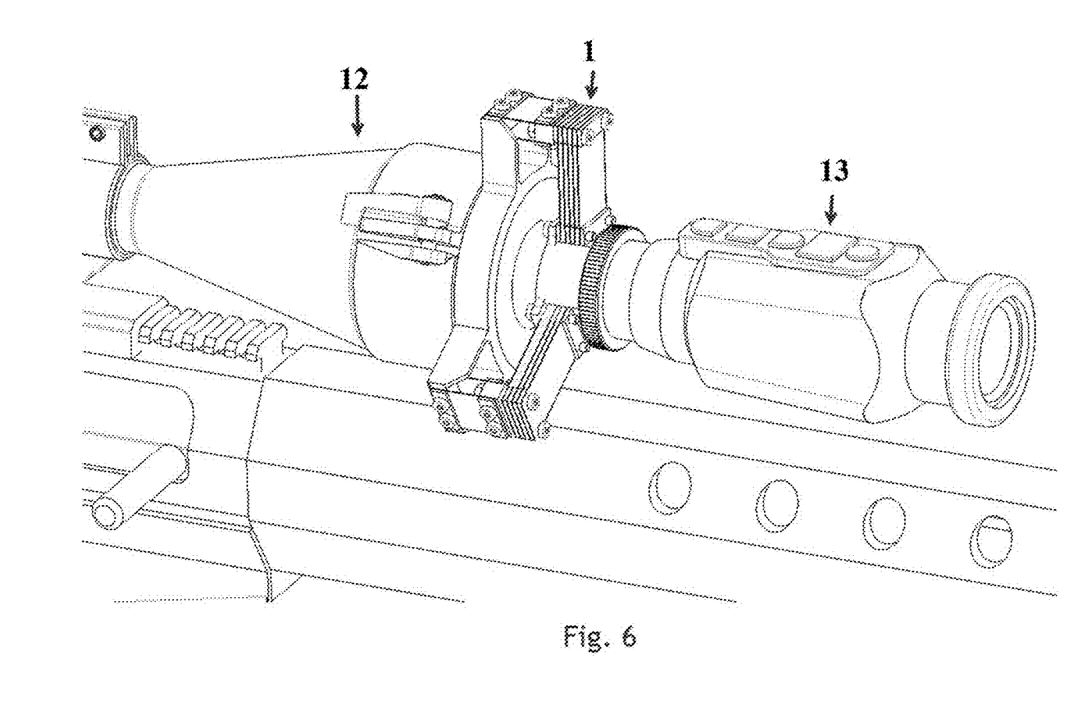
FIG. 6 is a drawing showing an exploited view of FIG. 5 of the scope, the device of the invention, and the thermal IR-camera.

FIG. 6 is a drawing of an exploited view of FIG. 5 showing the end of the scope (12) close to the embodiment (1) in FIG. 4, and the details of the device of invention and the thermal IR-camera better (13).

FIG. 7 is a drawing of a front view of FIG. 4 and a coordinate system drawn with the origin in the center of the opening of the annular first member (6). The second sets of blades are not visible as they are hidden behind the first sets of blades. Thus, each of these three modules have the first set of blades and the second set of blades in a same plane. The same is the case for two modules placed with 180 degrees between the two modules.

The minimum number of modules are two, placed radially on the first annular member with 180 degrees between the two modules.

The number of modules in all the figures is the optimal number of modules which provides high stiffness in all the directions in the X-Y plane. A device with a higher number of modules will typically be heavier which means that stronger recoil forces, linear movements, should be mitigated.

Three is the optimum which makes it possible to keep the area between the scope and the firearm free. This is important, as the distance should be as little as possible. Nothing is allowed to point downwards from the scope and its accessories.

The preferred solution with three modules requires only 2 mm clearance.

Figure 8:
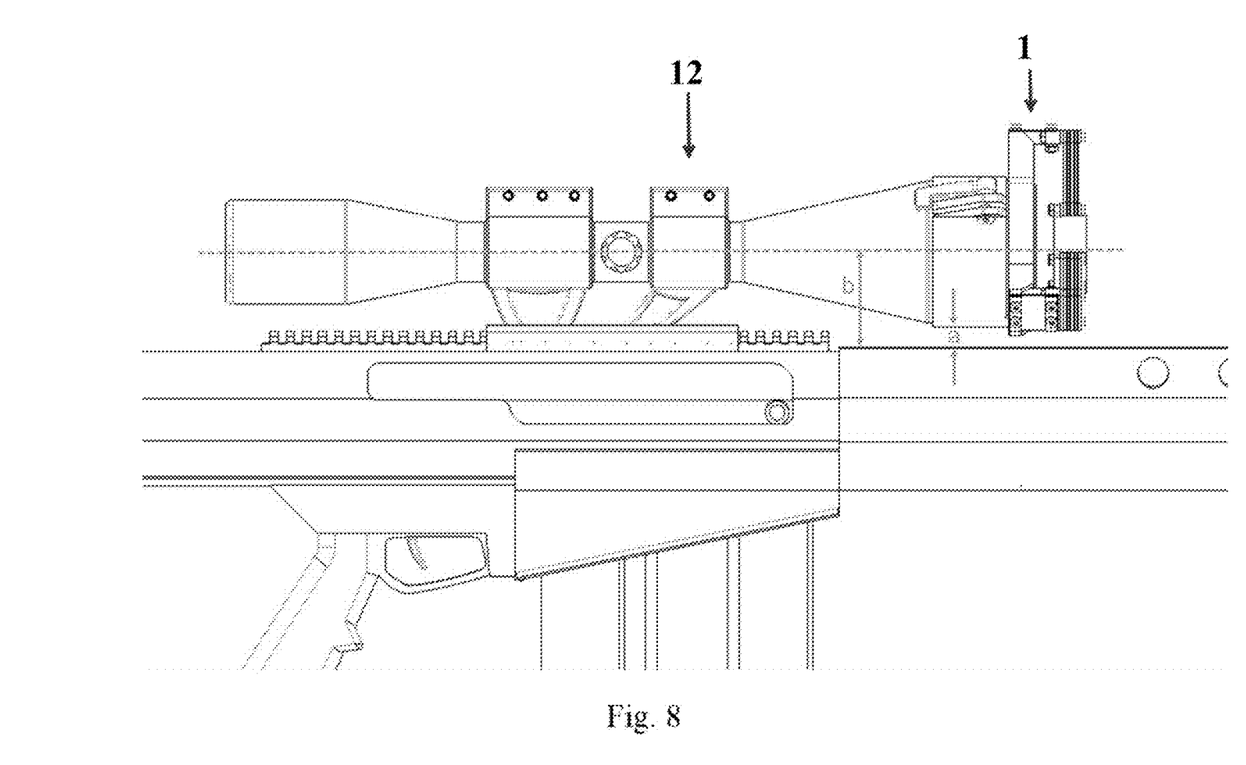
FIG. 8 is a drawing showing an exploited view as in FIG. 3 with marks indicating two important distances on a 50 BMG rifle.

FIG. 8 is a drawing of FIG. 3, where "a" denotes the distance to be cleared between the scope (12) and the firearm. Here 2 mm on a 50 BMG rifle. The other distance is "b" between the middle of the scope and the adjusting rail on top of the barrel of the firearm. The shorter the distance "b" the more precise the scope.

A device according to the invention may comprise at least one annular member in one or both of the open ends facing away from the device having a thread which matches the thread or an adapter interface of either the end of a scope or an accessory.

Figure 9:
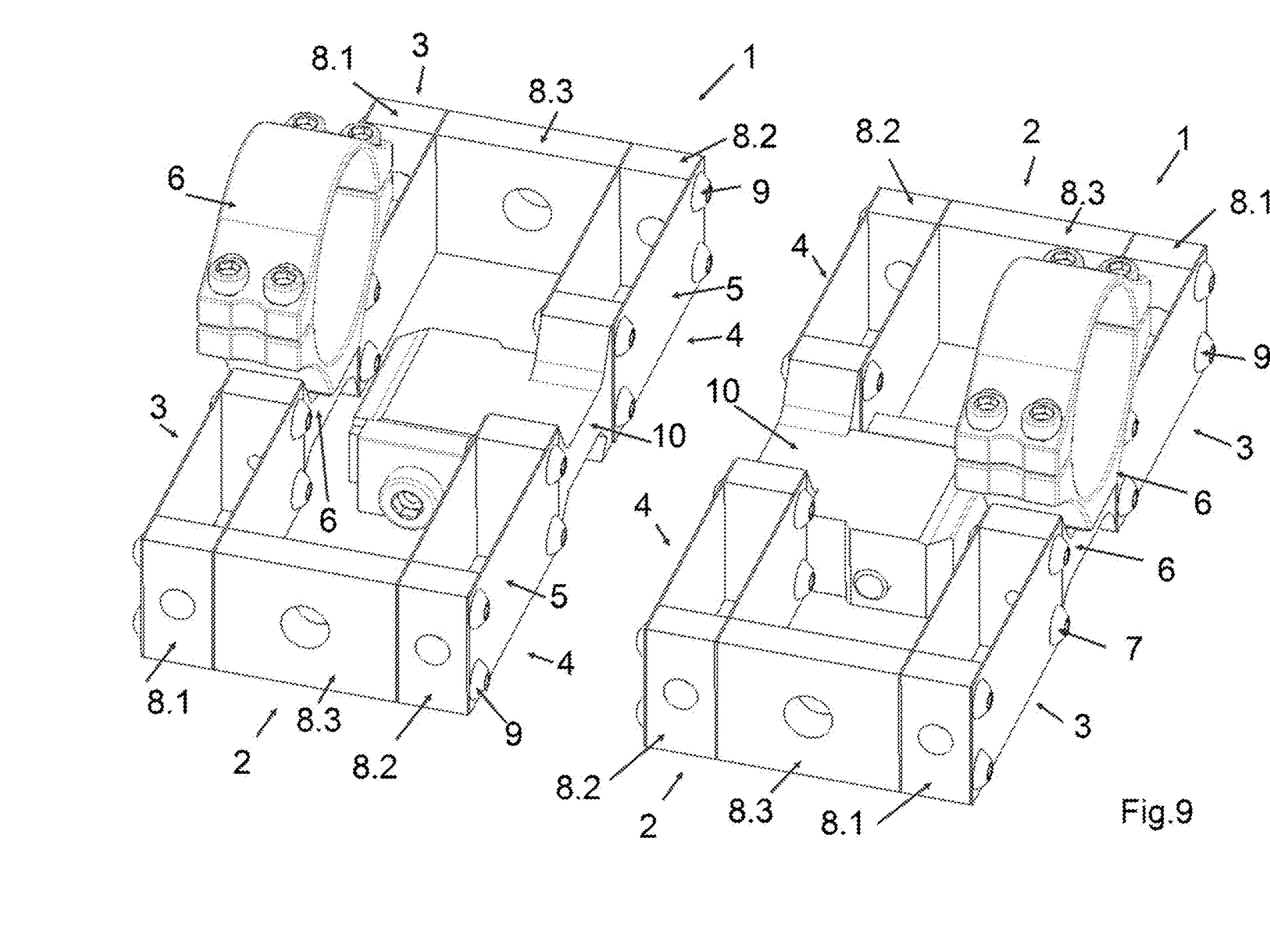
FIG. 9 is a drawing showing a third embodiment of the device according to the invention.

FIG. 9 is a drawing of two devices of a third embodiment of the invention. Each device (1) has two modules (2) comprising a first set (3) placed on a first member (6) and a second set (4) of blades (5) placed on a second member (10), with 180 degrees between two adjacent modules (2). The first device and the second device are a mirror image of the other. The first set has a blade on each side a first spacer (8.1) and is connected to a second set of blades having a second spacer (8.2) between two blades via a third spacer (8.3).

Figure 10:
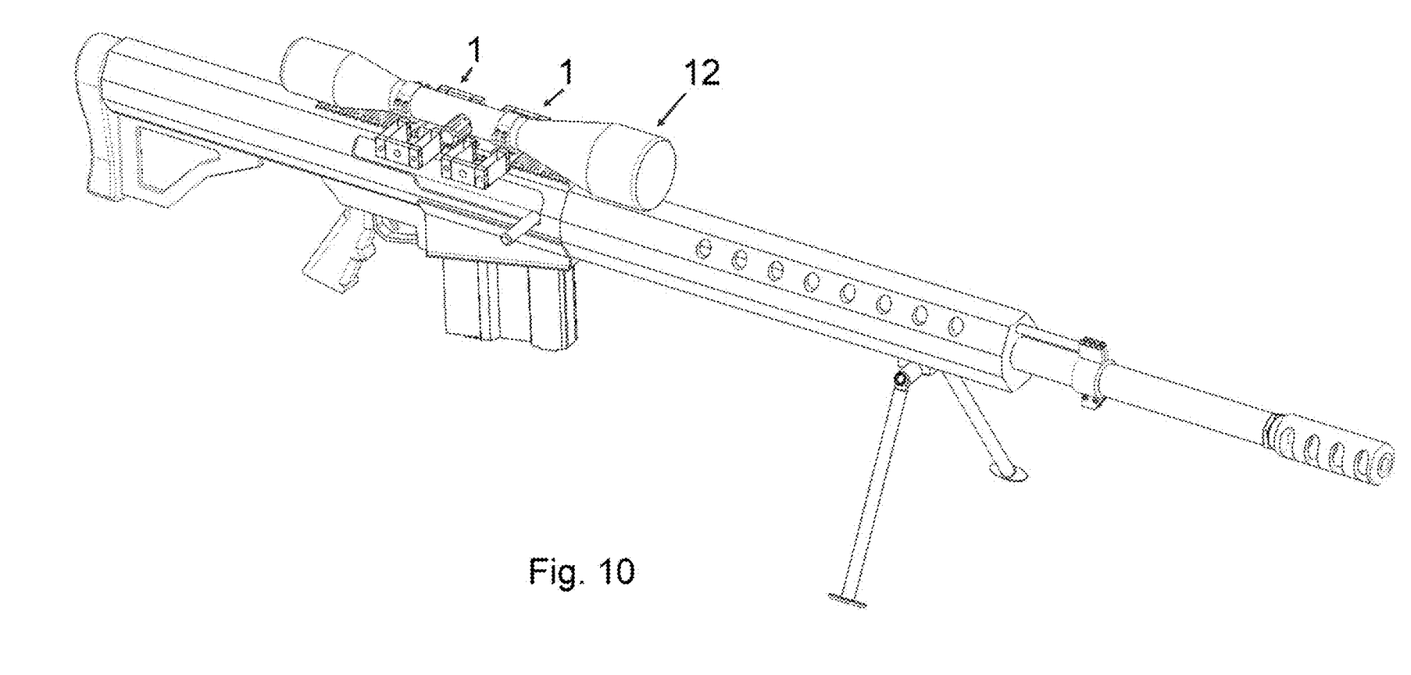
FIG. 10 is a drawing showing a 50 MBG rifle with the third embodiment of the invention in FIG. 9, two modules mounted one on each side of the scope and between the 50 BMG rifle and its scope. There is a device in a first end and a second in the other end.

FIG. 10 is a drawing of a BMG rifle where the two devices (1) of FIG. 9 are mounted between the rifle scope (12) and the rifle.

Figure 11:
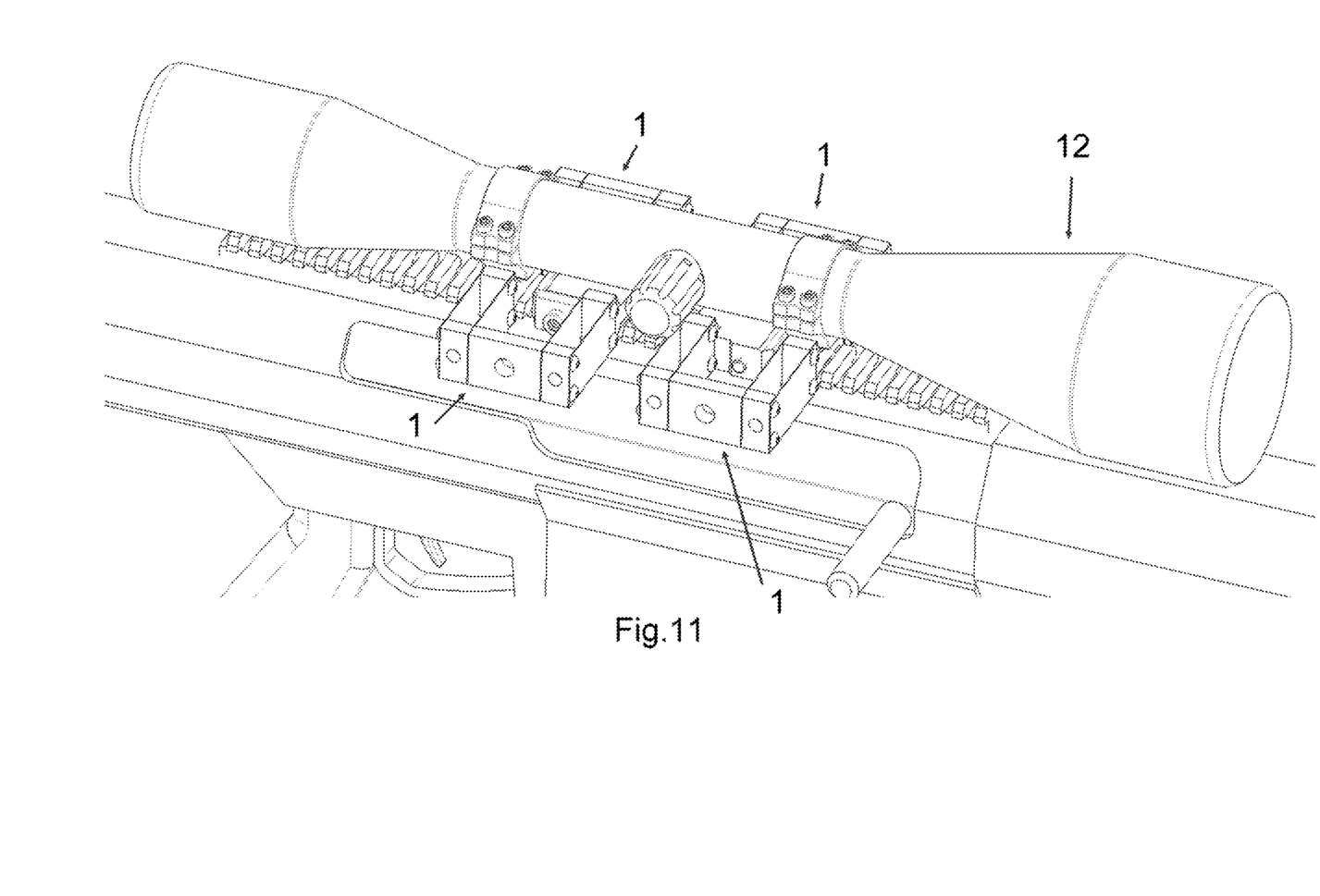
FIG. 11 is a drawing showing an exploited view of the section with the 50 BMG rifle and the scope in FIG. 10.

FIG. 11 is a drawing of an exploited view of FIG. 10 showing the scope (12) mounted on the two devices (1) of FIG. 9 better. If a thermal IR-camera is mounted on the scope stronger modules are required than without having a thermal IR mounted.

The material for the blades is high strength stainless spring steel (0.3 mm to 0.5 mm) (1,310×10CrNi18-8 AISI 302 (301) RM 1300-1500 or 1500-1700 N/mm2). The width 20 mm, effective height (the part that can flex) L=30 mm, number of blades between 8 and 24 depending on the mass to be carried. Typical mass is 0.5 kg to 1.5 kg, but the invention is not limited to this as there are endless other materials and dimensions that can be used successfully.

The embodiment of FIG. 1 has four blades of L=30 mm in the first and two blades of L=12 mm in the second set in each module. All blades have a width of 20 mm. There are three modules. The thickness of the blades is 0.3 mm. The total number of blades are (4+2)×3=18.

The embodiment of FIG. 4 has five blades of L=30 mm in the first set of blades and two blades of L=12 mm in the second set of blades in each module. All blades have a width of 20 mm. There are three modules. The thickness of the blades is 0.3 mm. The total number of blades are (5+2)×3=21.

REFERENCE NUMBERS

1 Device of the invention
2 A module
3 A first set of blades
4 A second set of blades
5 Blade
6 First annular member 7 A bolt fixing first set of blades
8 A spacer
8.1 First spacer
8.2 Second spacer
8.3 Third spacer
9 A bolt fixing a second set of blades
10 Second member
11 Arm of J-lock Thus, although there have been described particular embodiments of the present invention of a new and useful Device for achieving frictionless linear movement in one direction and stiffness in all other directions it is not intended that such references be construed as limitations upon the scope of this invention except as set forth in the following claims.

What is claimed is:

1. A firearm having mounted a device achieving linear movement in single direction and stiffness in all other directions that comprises: the following attached to a first member symmetrically about a plane containing the single direction; at least two modules of blades, each blade having each a first end and a second end, the blades with equal spacing and shape, each module comprising a first set of blades and a second set of blades, where each set comprising at least two parallel blades; and where the first set of blades of each module are attached on the first member in said first end of the blades of said first set, and in the second end of the blades of said first set connected, via a spacer, to the second end of said second set of blades; the blades of the second set are attached to a second member, in the first end of the blades; the first set of blades of said at least two modules and the second set of blades of at least two modules mounted symmetrical about said plane containing the single direction;

characterized in that in each module the second set of blades is arranged to counteract the movement of the first set of blades in a direction which is perpendicular to said single direction, to obtain relief of a secondary movement of said first set of blades;

thereby allowing said first ends of the first set of blades and said first member to travel friction free in said single direction of linear motion relative to said second ends without rotation and as a consequence resulting in a direction of travel of said second ends of said first set of blades with a direction component perpendicular to said single direction, whereby, the movement in the single direction, or the movement perpendicular to the single direction, or a combination of the these movement components of the second ends of said second set of blades have a component of movement in the direction of travel of said first set of blades perpendicular to said single direction to allow each of the second set of blades to provide friction free relief of said first set of blades in the direction perpendicular to the single direction, maintaining constant angles and high stiffness in all directions but said single direction of travel of said first set of blades; comprising further a first member and a second member wherein the first member has an annular part, and the second member has an annular part configured close to the first member, the annular parts of the first member and of the second member having the same radius, and their centers on a straight line going through the same point and perpendicular to an X-Y-plane; wherein said first member is adapted to be mounted onto a first accessory and second member is adapted to be mounted onto a scope of a firearm, the number of said modules of blades is two or three, and if two the angle between two adjacent modules of blades is 180 degrees, and if three the angle between two adjacent modules of blades is 120 degrees; the firearm having the device mounted between a scope of the firearm and said first accessory.

2. A firearm according to claim 1 wherein said first accessory is a thermal IR-camera, light intensifier, laser pointer, or vision camera.

3. A firearm having mounted a device achieving linear movement in single direction and stiffness in all other directions that comprises: the following attached to a first member symmetrically about a plane containing the single direction; at least two modules of blades, each blade having each a first end and a second end, the blades with equal spacing and shape, each module comprising a first set of blades and a second set of blades, where each set comprising at least two parallel blades; and where the first set of blades of each module are attached on the first member in said first end of the blades of said first set, and in the second end of the blades of said first set connected, via a spacer, to the second end of said second set of blades; the blades of the second set are attached to a second member, in the first end of the blades; the first set of blades of said at least two modules and the second set of blades of at least two modules mounted symmetrical about said plane containing the single direction; characterized in that in each module the second set of blades is arranged to counteract the movement of the first set of blades in a direction which is perpendicular to said single direction, to obtain relief of a secondary movement of said first set of blades; thereby allowing said first ends of the first set of blades and said first member to travel friction free in said single direction of linear motion relative to said second ends without rotation and as a consequence resulting in a direction of travel of said second ends of said first set of blades with a direction component perpendicular to said single direction, whereby, the movement in the single direction, or the movement perpendicular to the single direction, or a combination of the these movement components of the second ends of said second set of blades have a component of movement in the direction of travel of said first set of blades perpendicular to said single direction to allow each of the second set of blades to provide friction free relief of said first set of blades in the direction perpendicular to the single direction, maintaining constant angles and high stiffness in all directions but said single direction of travel of said first set of blades; comprising further a first member and a second member wherein the first member has an annular part, and the second member has an annular part configured close to the first member, the annular parts of the first member and of the second member having the same radius, and their centers on a straight line going through the same point and perpendicular to an X-Y-plane; wherein said first member is adapted to be mounted onto a scope and the second member is adapted to be mounted onto a firearm and the modules configured to be in a plane perpendicular to the single direction which is the viewing direction of the scope, and the angle if two modules, within one module the angle between the two first set of blades and between the two second set of blades of the two adjacent modules of blades is 180 degrees, or if three modules the angle between each two adjacent first set of blades and between each two adjacent second set of blades of the three adjacent modules of blades is 120 degrees; wherein said device is mounted to the firearm and said scope.

* * * * *